United States Patent

Brun

[15] 3,687,517

[45] Aug. 29, 1972

[54] DOPPLER EFFECT FREQUENCY MONITORING SYSTEM

[72] Inventor: Henri Brun, Paris, France

[73] Assignee: Thomson-CSF

[22] Filed: July 22, 1970

[21] Appl. No.: 57,069

[30] Foreign Application Priority Data

July 31, 1969 France..................6926312

[52] U.S. Cl. ...............356/28, 356/106, 250/199
[51] Int. Cl. .........................................G01p 3/36
[58] Field of Search ............324/79; 356/5, 28, 106; 250/199

[56] References Cited

UNITED STATES PATENTS

| | | | |
|---|---|---|---|
| 3,431,514 | 3/1969 | Oshman et al. | 250/199 |
| 3,563,664 | 2/1971 | Campbell et al. | 356/106 |
| 3,547,524 | 12/1970 | Javan et al. | 356/106 |
| 3,409,369 | 11/1968 | Bickel | 250/199 |
| 3,419,330 | 12/1968 | Schneider | 356/106 |
| 3,415,995 | 12/1968 | Kerr | 250/199 |

*Primary Examiner*—Benjamin A. Borchelt
*Assistant Examiner*—S. C. Buczinski
*Attorney*—Cushman, Darby & Cushman

[57] ABSTRACT

The present invention relates to the controlling or piloting of the frequency of a radio oscillator, by a quantum oscillator, or vice-versa. The object of the invention is a Doppler effect comparator device comprising means for modulating the optical oscillation produced by the quantum oscillator at a frequency generated by a radio oscillator. Interferometric means are provided in order to heterodyne said modulated wave with the modulated wave reflected by a moving obstacle. This technique makes it possible to substitute for the comparison of the frequencies received by the comparator, the comparison of the Doppler frequencies which result.

11 Claims, 7 Drawing Figures

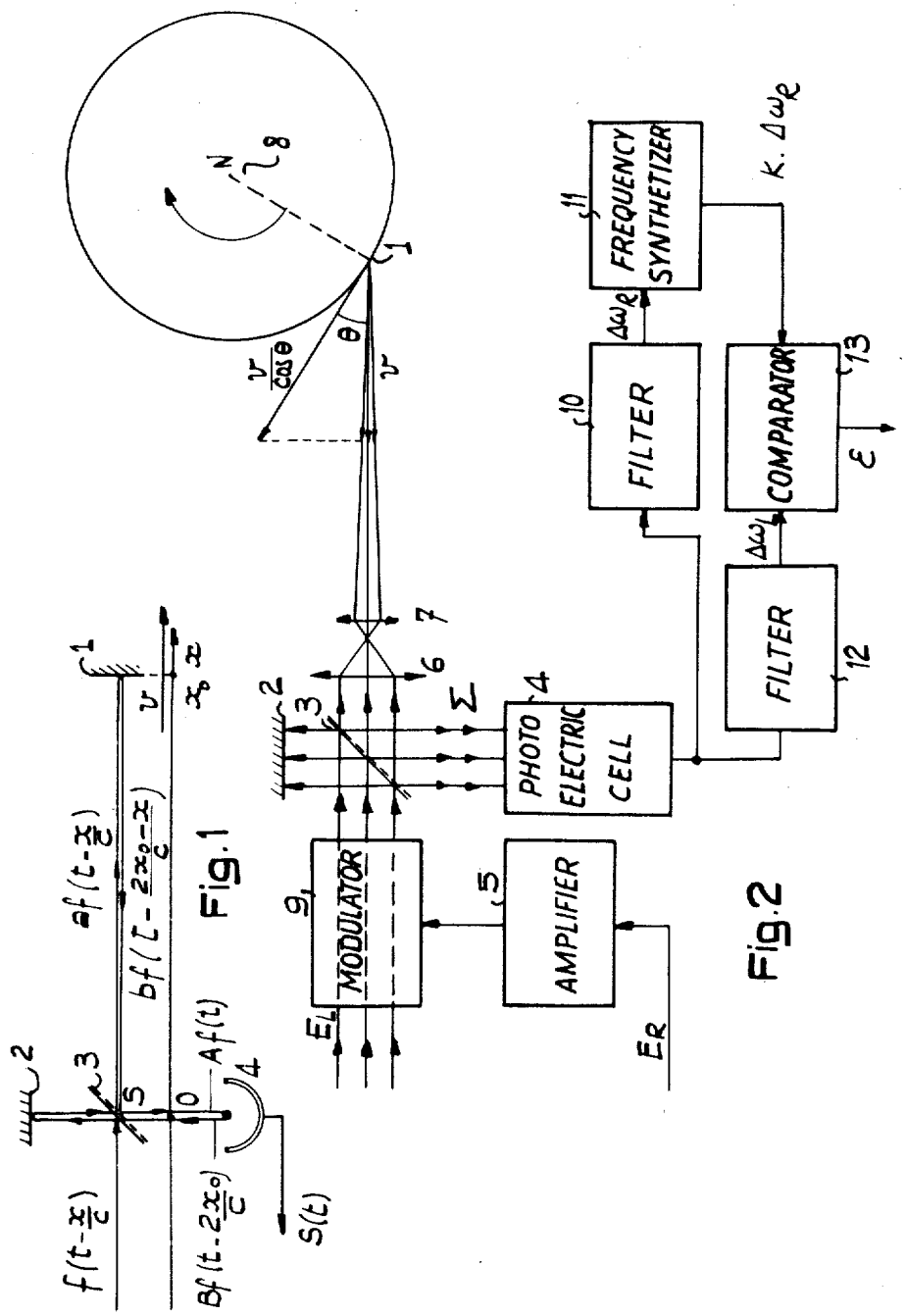

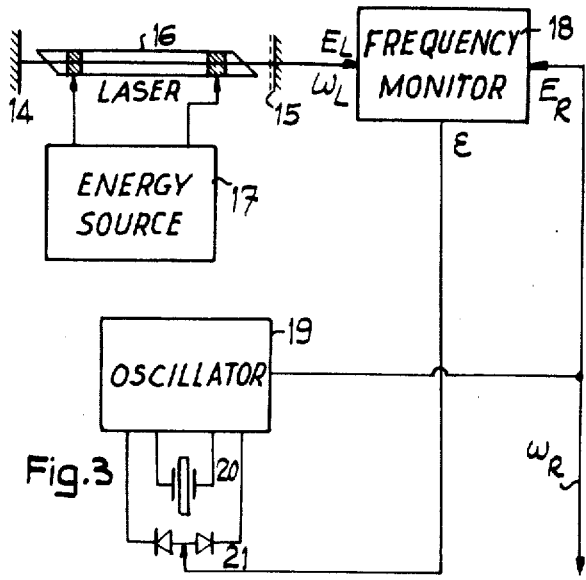
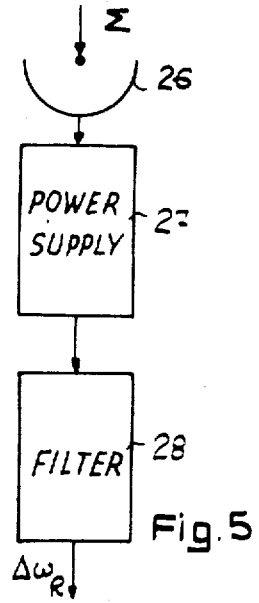
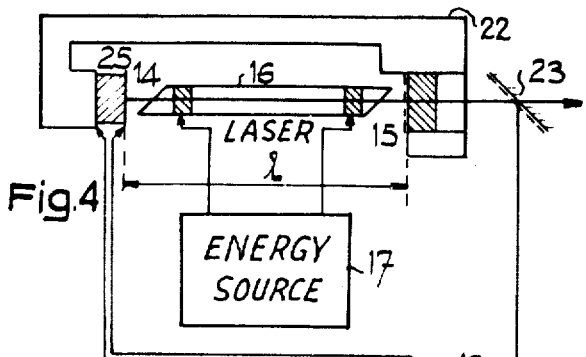
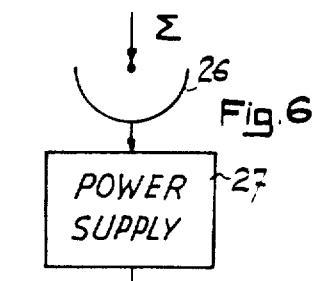
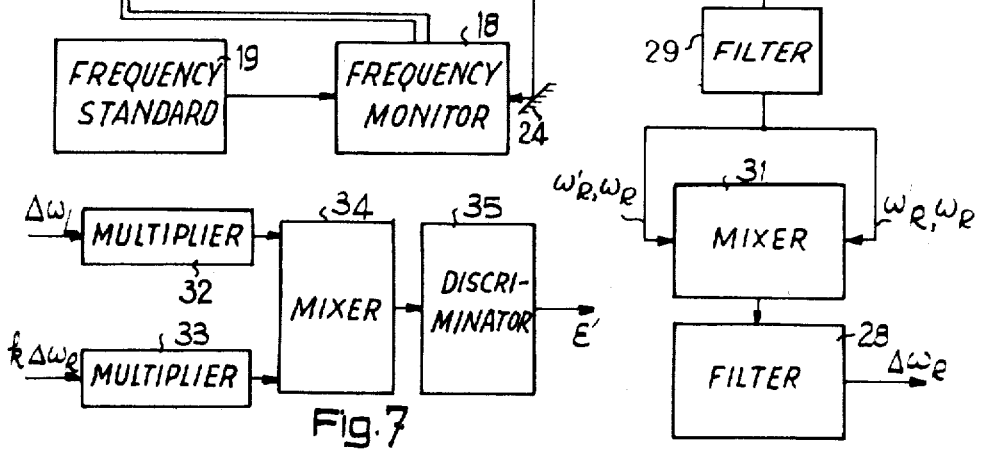

DOPPLER EFFECT FREQUENCY MONITORING SYSTEM

The present invention relates to devices for comparing a frequency in the radio electric spectrum, with another, much higher frequency such as the optical frequency produced by a laser. The gap lying between the frequency range of the conventional radio frequency oscillators and the frequency range of the quantum radiation sources must be bridged by providing a relationship which is both simple and accurate in order that the same scale of frequencies can be used regardless, from one end to the other of the whole range of oscillatory phenomena.

At the present state of the art, radio electric oscillations are defined in terms of their frequency whereas optical oscillations are defined in terms of their wavelength ; the result is that in order to effect comparisons between these two types of oscillations, it is necessary to take into account the velocity of propagation of electromagnetic waves in a vacuum. This is a drawback since it means that in this kind of measurement system three sorts of units have to be used ; in addition, to control the frequency of a quantum oscillator by the frequency produced by a reference radio electric oscillator, a frequency-wavelength conversion of a greater of lesser degree of accuracy has to be provided.

The present invention relates to Doppler effect frequency monitoring system for comparing with one another the frequencies of a radio electric signal and an electromagnetic wave emerging from an optical source, said monitoring system comprising : electro-optical modulator means having first and second inputs for respectively receiving said signal and said wave, photo electric means positioned for receiving a first portion of the electromagnetic energy emerging from said modulator means, a semi-reflective mirror, Doppler effect reflector means for receiving through said semi-reflective mirror a second portion of electromagnetic energy emerging from said modulator means and for reflecting the same via said semi-reflective mirror toward said photo electric means, first filtering means coupled to the output of said photo electric means for selectively transmitting a first Doppler frequency linked to the frequency of said signal and second filtering means coupled to said output for selectively transmitting a second Doppler frequency linked to the carrier frequency of said wave ; frequency synthetizer means being coupled to said first filtering means for supplying an electrical signal having a frequency K times higher than said first Doppler frequency, and frequency comparator means having third and fourth inputs respectively coupled to the outputs of said synthetizer means and said second filtering means ; said frequency comparator means supplying an error signal having a value depending on the difference between K times the frequency of said radio electric signal and the carrier frequency of said wave.

The present invention relates likewise to frequency-controlled oscillator devices which use the Doppler-effect comparator hereinbefore referred to.

The invention will be better understood from a consideration of the ensuing description and the attached figures in which :

FIG. 1 is an explanatory diagram ;

FIG. 2 illustrates an embodiment of the comparator device in accordance with the invention ;

FIG. 3 is a diagram of a crystal oscillator controlled by a stabilized laser ;

FIG. 4 is a diagram of a quantum oscillator whose frequency of emission is controlled by a reference radio oscillator;

FIGS. 5 and 6 illustrate details of the device of FIG. 2.

FIG. 7 illustrates a diagram of a frequency comparator which can be used in the device of FIG. 2.

The Doppler-effect upon which the operation of the frequency comparator in accordance with the invention is based, can be understood from a consideration of the diagram of FIG. 1. This explanatory diagram shows an axis ox at the origin of which there is provided a semi-transparent mirror 3 lying between a fixed mirror 2 and photoelectric detector 4 ; another mirror 1 is located at the point $x = x_o$ on the abscissa. A wave $$f\left(t - \frac{x}{c}\right)$$

propagating at the velocity c in the direction of the mirror 1 is split by the mirror 3 into a wave $$f\left(t - \frac{x}{c}\right)$$

travelling towards the mirror 1, and another wave which follows a path normal to the axis x to illuminate the detector 4 with an intensity $Af(t)$ ; to simplify matters, no account has been taken of the delay experienced over the vertical part of the transmission path. It will readily be appreciated that the wave incident upon the mirror 1 gives rise to a regressive wave $$bf\left(t - \frac{2x_0 - x}{c}\right)$$

which provides an illumination intensity $$Bf\left(t - \frac{2x_0}{c}\right)$$

at the detector 4.

If the mirror 1 is given a translatory velocity $v$ parallel to ox, it will produce an illumination level $$Bf\left(t - \frac{2vt}{c}\right)$$

at the detector ; this illumination differs essentially from $Af(t)$ in that the variable $t$ is multiplied by the factor $$\left(1 - \frac{2v}{c}\right)$$

. If the wave transmitted to the mirror 3 has an angular frequency $\omega$ , the movement of the mirror 1 will produce at the output of the detector 4 a beat signal $S(t)$ the Doppler angular frequency $\Delta\omega$ of which is equal in absolute value to $2v\omega/c$.

The foregoing remains valid when the wave transmitted to the mirror 3 is modulated. By way of a non-limitative example, let us consider the case of an amplitude-modulated light wave. The illumination levels received by the detector 4 can be expressed as follows :

$$A \cdot f(t) = A(1 + m \cos \omega_R t) \cos \omega_L t$$

$$Bf\left(t - \frac{2vt}{c}\right) = B(1 + m \cos \omega'_R t) \cos \omega'_L t$$

where: $\omega_L$ is the angular frequency of the carrier wave
$\omega_R$ is the angular frequency of the modulation envelope
m is the modulation index $$\omega'_R = \omega_R + \Delta\omega_R$$

$$\omega'_L = \omega_L + \Delta\omega_L$$

$\Delta\omega_R = 2\omega_R v/c$ (Doppler angular frequency); and $\Delta\omega_L = 2\omega_L v/c$ (Doppler angular frequency).

These two illumination signals are applied simultaneously to a square law detector for supplying from the detector 4 an output signal containing beat or heterodyne components which are in accordance with the relationship:

$$S(t) = AB \begin{array}{c} 1 + m \cos \omega_R t + m \cos \omega'_R t \\ + \dfrac{m^2}{2} \cos (\omega_R + \omega'_R)t + \dfrac{m^2}{2} \cos \Delta\omega_R t \end{array} \cos \Delta\omega_L t \quad (1)$$

The latter signal contains the Doppler angular frequencies $\Delta\omega_R$ and $\Delta\omega_L$ which are linked to the angular frequencies $\omega_R$ and $\omega_L$ by the following equation:

$$\frac{\omega_R}{\omega_L} = \frac{\Delta\omega_R}{\Delta\omega_L} \quad (2)$$

In FIG. 2, a Doppler-effect frequency comparator device in accordance with the invention can be seen. It comprises two inputs $E_L$ and $E_R$ to which there are respectively applied an electromagnetic radiation with an angular frequency $\omega_L$, and a radio electric signal with an angular frequency $\omega_R$. The radio electric signal is amplified by the amplifier 5 before being applied to the modulation input of an electro optical modulator 9. The modulated radiation coming from the modulator 9 passes successively through the semi-transparent mirror 3 and a set of lenses 6 and 7 in order to form a beam of small apertural angle which converges at a point 1 on the periphery of a wheel 8.

The periphery of the wheel 8 is constituted by a scattering surface, obtained for example by sand-blasting and comprising a very large number of reflective microscopic facets; the wheel rotates rapidly about the center N so that the scattering surface passes tangentially at a velocity $v/\cos\theta$ past the point of incidence of the beam coming from the lens 7; angle $\theta$ is the angle made between the slightly converging rays on the one hand, and a tangent to the wheel 8 on the other. The component of the velocity $v$ which is directed along the line of said rays, represents a substantially constant approach velocity. The point 1 on the wheel 8 thus reflects onto the lens 7 a diffuse radiation which has the same characteristics as if it had been reflected by a mirror moving at the velocity $v$ in the direction of the lens 7. This diffuse radiation is picked up by the lens 7 and passed through the lens 6 which builds up with lens 7 a stigmatic optical system; it is finally incident upon the photoelectric detector 4 after being reflected at the mirror 3. The non-transmitted portion of the energy received by the mirror 3 follows a different path; it is reflected onto a mirror 2 which in turn reflects it via the mirror 3 to the input of the detector 4 As shown in FIG. 2, mirror 2, mirror 3, and the reflecting arrangement 6, 7, 8 constitute a Michelson interferometer.. The signal appearing at the output of the detector 4 contains signals with the angular frequencies $\omega_R$, $\omega'_R$, $\omega_R + \omega'_R$ and $\Delta\omega_R$; these are applied to filtering circuits 10 and 12 which respectively transmit the components $\Delta\omega_R$ and $\Delta\omega_L$ to a frequency synthetizer 11 and a frequency comparator 13. The frequency synthetizer supplies the comparator 13 with a signal containing a pulsatory component k times higher than the pulsatory component $\Delta\omega_R$, which it receives. The error signal $\epsilon$ produced by the comparator 13 reduces to zero when the Doppler angular frequency $\Delta\omega_L$ is equal to the angular frequency $k\Delta\omega_R$ produced by the synthesizer; this corresponds to the case in which the angular frequencies $\omega_L$ and $\omega_R$ of the signals applied to the inputs $E_L$ and $E_R$, are in the ratio k determined by the synthesizer 11.

On the other hand, if one of the angular frequencies $\omega_L$ or $\omega_R$ has changed its value, the signal $\epsilon$ has a value other than zero, since one of the Doppler angular frequencies $\Delta\omega_L$ or $\Delta\omega_R$ has likewise changed its value.

It should be pointed out that the fluctuations in the velocity of rotation of the wheel 8 do not affect the equation (2); however, it is necessary to maintain these fluctuations within sufficiently narrow limits in order to simplify the design of the elements 10, 11, 12 and 13 which have to filter, synthesize and compare the Doppler angular frequencies.

By way of a non-limitative example, we may consider the case in which it is necessary to compare the frequency of a wave emitted by a laser at the wavelength $0.6\mu$, with a ratio electric oscillation at $\nu_R = 10$ MHz.

If the wheel 8 has a diameter of 10 cm and rotates at a speed of 30,000 rpm, the peripheral velocity $v/\cos\theta$ is equal to 157 meters per second. Under these circumstances, the velocity $v$ of the displacement of the reflective facets past the point 1 can be considered as equal to 150 meters per second or $0.5 \cdot 10^{-6}$ of the velocity of light. The Doppler frequency $\Delta\omega R/2\pi$ corresponding to the radio electric wave will be equal to 10 Hz whilst the Doppler frequency $\Delta\omega L/2\pi$ of the 0.6 $\mu$ wave will be in the order of 500 MHz. The frequency synthetiser 11 multiplies the pulsatory component $\Delta\omega_R$ by factor $k$ approximately equal to $5 \times 10^7$; the precise value of the coefficient $k$ is selected as a function of the ratio $\omega L/\omega_R$ which has been decided.

In FIG. 3, a device can be seen which makes it possible to control the frequency of a crystal-controlled oscillator 19 in order to keep it $k$ times lower than the frequency produced by a stabilized laser. The laser substantially comprises a tube 16 filled for example with neon helium which is ionized by means of a power source 17; the tube 16 is placed in an optical cavity containing a mirror 14 and a semi-transparent mirror 15; to simplify an understanding of the system, the elements which make it possible to obtain a very fine and strictly stable emitted spectrum line, have not been shown. The radiation with the angular frequency $\omega_L$, produced by the laser, is directed to the input $E_L$ of the frequency comparator 18; the comparator 18 is of the kind shown in FIG. 2 and has an input $E_R$ to which there is applied the signal with the angular frequency $\omega_R$, produced by the oscillator 19. The oscillator 19 contains a crystal 20 and a set of variable-capacitance diodes 21 which are biased by means of the error voltage coming from the comparator 18. The comparator 18 is designed so that the error signal ε is zero when the ratio $\omega_L/\omega_R$ is equal to the whole number or fraction $k$.

If this ratio tends to change, the error voltage acquires a value and a polarity such that the tuning of the oscillator 19 is made to set the angular frequency $\omega_R$ to the reference value which is the $k^{th}$ part of $\omega_L$.

In FIG. 4 a device is illustrated which makes it possible to control the angular frequency $\omega_L$ of a laser in order to maintain it at a value $k$ times the angular frequency $\omega_R$ of the signal produced by the frequency standard 19. The laser contains elements 14, 15, 16 and 17 shown in FIG. 3 ; the mirror 15 is fixed to a frame 22, whilst the mirror 14 is connected to said frame through the medium of an electromechanical transducer 25 which enables the tuning of the optical cavity to be changed by displacement of the mirror 14. A certain proportion of the energy radiated by the laser is flapped off by the semi-transparent mirror 23 ; this radiation fraction is directed by a mirror 24 to the input $E_L$ of a comparator 18 of a kind shown in FIG. 2.

The input $E_R$ of the comparator 18 receives the signal having the angular frequency $\omega_R$ produced by the frequency standard 19; the output of the comparator 18 supplies the transducer 25. The error signal ε present at this output adjusts the distance $l$ between the mirrors 14 and 15 in order to keep the angular frequency $\omega_L$ radiated by the laser, equal to $k$ times the angular frequency $\omega_R$. The factor $k$ is a whole number or fraction the value of which depends upon the design of the comparator 18.

In FIG. 5, the diagram of a first embodiment of the elements 4 and 10 of FIG. 2 can be seen. The mixture Σ of incident waves and those reflected from the point 1 of the wheel 8, is received by a photomultiplier 26 associated with a supply device 27 ; the variable voltage produced at the output of the device 27 includes an angular frequency $\Delta\omega_R$ which is selected by the bandpass filter 28.

In FIG. 6, the diagram of a second embodiment of the elements 4 and 10 of FIG. 2 can be seen. It differs from the former one by the fact that the photomultiplier 26 and its power supply 27 produce angular frequencies $\omega_R$ and $\omega'_R$ which are supplied to a filter 29 tuned to select them. The output of the filter 29 is connected to the two inputs of a mixer 31 at the output of which there is connected a filter 28 ; the filter 28 transmits the angular frequency $\Delta\omega_R$.

The filter 29 simply form a single filter which passes the angular frequencies $\omega_R$ and $\omega'_R$, and simultaneously supplies the inputs of the mixer 31.

This technique has advantages where the modulation index $m$ is low, since the amplitudes of the angular frequencies $\omega_R$ and $\omega'_R$ are proportional to $m$ and are higher than the amplitude, proportional to $m^2/2$, of the pulsatory component $\Delta\omega_R$.

In FIG. 7, a variant embodiment of the frequency comparator 13 shown in FIG. 2 can be seen.

The signals having the angular frequencies $\Delta\omega_L$ and $k\Delta\omega_R$ are applied to frequency multiplier circuits 32 and 33 which supply the inputs of a mixer 34 ; the output of the mixer 34 is connected to a frequency discriminator 35 which produces an error signal ε' which represents the frequency of the waveform supplied from mixer 34 ; this last mentioned frequency is equal to the difference of the frequencies applied to the mixer 34. In the numerical example described hereinbefore, the frequencies $\Delta\omega_L/2\pi$ and $k\Delta\omega_R/2\pi$ will for example by multiplied by 20 in order that the mixer 34 shall receive signals lying in the 10 GHz band.

What I claim is:

1. Doppler effect frequency monitoring system for comparing with one another the frequencies of a radio electric signal and an electro-magnetic wave emerging from an optical source, said monitoring system comprising : electro-optical modulator means having first and second inputs for respectively receiving said signal and said wave, photo-electric means positioned for receiving a first portion of the electromagnetic energy emerging from said modulator means, a semi-reflective mirror, Doppler effect reflector means for receiving through said semi-reflective mirror a second portion of the electromagnetic energy emerging from said modulator means and for reflecting the same via said semi-reflective mirror toward said photo electric means first filtering means coupled to the output of said photo electric means for selectively transmitting a first Doppler frequency linked to the frequency of said signal and second filtering means coupled to said output for selectively transmitting a second Doppler frequency linked to the carrier frequency of said wave; frequency synthetizer means being coupled to said first filtering means for supplying an electrical signal having a frequency K times higher than said first Doppler frequency, and frequency comparator means having third and fourth inputs respectively coupled to the outputs of said synthetizer means and said second filtering means ; said frequency comparator means supplying an error signal having a value depending on the difference between K times the frequency of said radio electric signal and the carrier frequency of said wave.

2. Monitoring system as claimed in claim 1, wherein said Doppler effect reflector means comprises : a wheel and means for driving said wheel at a uniform rotational speed ; the periphery of said wheel being a matt surface passing through a fixed point ; and stigmatic optical means being positioned for receiving said second portion of energy and converging it at said point on said surface.

3. Monitoring system as claimed in claim 1, wherein the electromagnetic energy emerging from said modulator means is collected by beam splitting means comprising said semi-reflective mirror and a further mirror positioned for receiving said first energy portion and reflecting it onto said photo electric means.

4. Monitoring system as claimed in claim 3, wherein said beam splitting means constitutes a Michelson interferometer ; one of the mirrors of said interferometer being constituted by said Doppler effect reflector means.

5. Monitoring system as claimed in claim 1, wherein said photoelectric means includes a photomultiplier tube associated with a power source.

6. Monitoring system as claimed in claim 1, wherein said first filtering means comprises a bandpass filter turned to said first Doppler frequency.

7. Monitoring system as claimed in claim 1, wherein said first filtering means comprises: a first filter selectively transmitting the frequency of said signal and the frequency of said signal modified by the Doppler effect, a mixer having two inputs coupled to the output of said first filter and a second filter connected to the output of said mixer for selectively transmitting said first Doppler frequency.

8. Monitoring system as claimed in claim 1, wherein said frequency comparator means comprises two frequency multiplier circuits, a mixer having first and second inputs respectively connected to the outputs of said multiplier circuits, and a frequency discriminator connected to the output of said mixer.

9. A controlled frequency signal generator embodying a frequency monitoring system as claimed in claim 1, said signal generator comprising : a radio electric oscillator and a quantum oscillator ; said oscillators respectively feeding said first and second inputs ; one of said oscillators having a frequency tuning input coupled to the output of said frequency comparator means ; said other oscillator having an output delivering a waveform of controlled frequency.

10. A signal generator as claimed in claim 9, wherein said radio electric and quantum oscillators are respectively a stable crystal controlled clock and a laser ; said laser having an optical cavity and an electromechanical transducer for tuning said cavity.

11. A signal generator as claimed in claim 9, wherein said radio electric and quantum oscillators are respectively a tuned oscillator and a frequency stabilized laser ; said tuned oscillator including a variable reactance tuning element.

* * * * *